United States Patent
Li et al.

(10) Patent No.: US 7,959,311 B2
(45) Date of Patent: Jun. 14, 2011

(54) PORTABLE ELECTRONIC DEVICE HAVING ILLUMINATED KEYBOARD

(75) Inventors: Qiao-Wei Li, Taipei (TW); Ming-Kai Hsiao, Taipei (TW)

(73) Assignees: Protek (Shanghai) Limited, Shanghai (CN); Pegatron Corporation, Taipei (TW)

( * ) Notice: Subject to any disclaimer, the term of this patent is extended or adjusted under 35 U.S.C. 154(b) by 235 days.

(21) Appl. No.: 12/405,892

(22) Filed: Mar. 17, 2009

(65) Prior Publication Data

US 2010/0089729 A1    Apr. 15, 2010

(30) Foreign Application Priority Data

Oct. 9, 2008  (TW) ................................ 97139031 A

(51) Int. Cl.
  *H01H 9/00* (2006.01)
(52) U.S. Cl. ............. 362/23; 362/253; 362/85; 345/168
(58) Field of Classification Search .................. 362/253, 362/85, 109, 23; 345/168, 172, 102, 22
  See application file for complete search history.

(56) References Cited

U.S. PATENT DOCUMENTS

| 6,040,822 | A | 3/2000 | Decker |
| 6,561,668 | B2 | 5/2003 | Katayama et al. |
| 6,776,497 | B1 | 8/2004 | Huppi et al. |
| 2005/0047073 | A1 | 3/2005 | Lo |

FOREIGN PATENT DOCUMENTS

| CN | 2685898 | 3/2005 |
| CN | 1664969 A | 9/2005 |

*Primary Examiner* — Anabel M Ton
(74) *Attorney, Agent, or Firm* — Muncy, Geissler, Olds & Lowe, PLLC

(57) ABSTRACT

A portable electronic device having an illuminated keyboard includes a display having a recessed portion and a main body pivotally connected with the display. The main body includes a casing, a keyboard, a fastening element, and a plurality of light-emitting elements. The keyboard is disposed at the casing and includes a plurality of keys made of a first light-transmitting material. Each key has a light incident surface and a light output surface. The fastening element is fastened to the casing and has a first portion made of a second light-transmitting material. The fastening element corresponds to the recessed portion. The light-emitting elements are disposed in the fastening element. The light emitted by the light-emitting elements passes through the first portion of the fastening element to directly enter into the key through the light incident surface and to be outputted from the key through the light output surface.

13 Claims, 5 Drawing Sheets

PORTABLE ELECTRONIC DEVICE HAVING ILLUMINATED KEYBOARD

CROSS REFERENCE TO RELATED APPLICATIONS

This Non-provisional application claims priority under 35 U.S.C.§119(a) on Patent Application No(s). 097139031 filed in Taiwan, Republic of China on Oct. 9, 2008, the entire contents of which are hereby incorporated by reference.

BACKGROUND OF THE INVENTION

1. Field of Invention

The invention relates to a portable electronic device and, more particularly, to a portable electronic device having an illuminated keyboard.

2. Related Art

With the development of the electronic technology, different kinds of electronic devices have become necessary articles in modern people's daily life, and they have closer and closer relation with modern people's work and entertainment. Portable electronic devices are small in size and are convenient to carry, and therefore they are often taken by people with them to be used for work or entertainment at any time. Therefore, the operating environment where the portable electronic devices are located generally changes with the change of the place of a user.

When the user operates the portable electronic device such as a notebook computer, if the ambient light in the vicinity of the portable electronic device is poor, the user may fail to recognize characters on a keyboard, and thus mis-operation may occur and eyestrain of the user may occur as well.

SUMMARY OF THE INVENTION

One objective of the invention is to provide a portable electronic device having an illuminated keyboard to improve the prior art.

The invention provides a portable electronic device having an illuminated keyboard. The portable electronic device includes a display and a main body. The display has a recessed portion. The main body is pivotally connected with the display, and it includes a casing, a keyboard, a fastening element, and a plurality of light-emitting elements.

The keyboard is disposed at the casing, and it includes a plurality of keys. At least one of the keys is made of a first light-transmitting material, and the key has a light incident surface and a light output surface. The fastening element is fastened to the casing, and it has a first portion made of a second light-transmitting material. The fastening element corresponds to the recessed portion. The light-emitting elements are disposed in the fastening element. The light emitted by the light-emitting elements passes through the first portion of the fastening element to directly enter into the key through the light incident surface and to be outputted from the key through the light output surface.

Therefore, according to the invention, even though a user is in an environment without sufficient ambient light, the user can recognize the positions of the keys via the illuminated keyboard provided by the invention thus to improve working efficiency. In addition, the illuminated keyboard provided by the invention has a simple structure, and cost is low. When the light-emitting elements illuminate the keyboard, it can also illuminate an engraved portion on the fastening element thus to make the engraved portion achieve an indicating function.

These and other features, aspects, and advantages of the present invention will become better understood with regard to the following description, appended claims, and accompanying drawings.

DETAILED DESCRIPTION OF THE INVENTION

Figure 1:
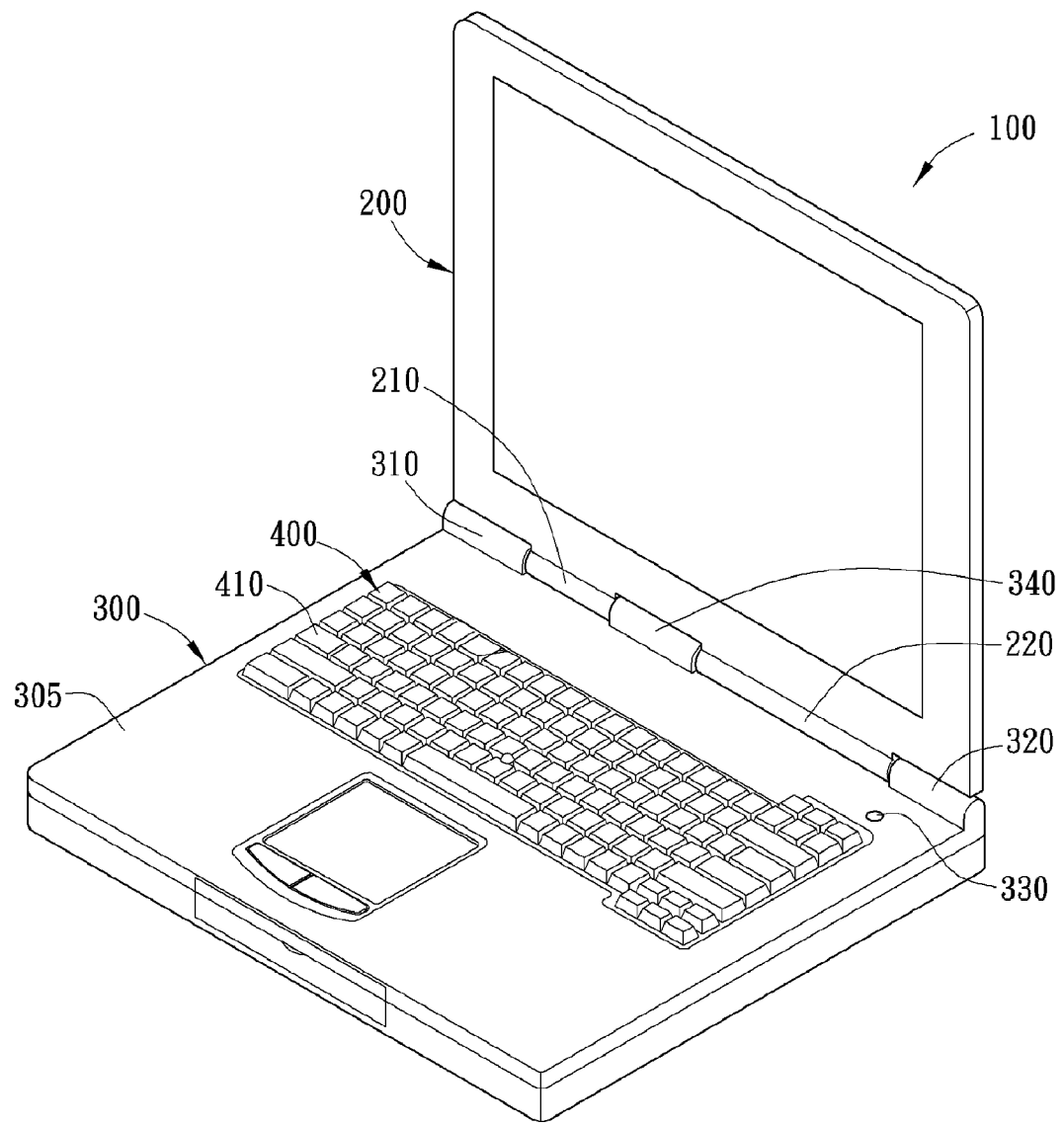
FIG. 1 is a schematic diagram of a portable electronic device according to a preferred embodiment of the invention.

FIG. 1 is a schematic diagram of a portable electronic device according to a preferred embodiment of the invention. In FIG. 1, a portable electronic device 100 is a notebook computer, and it includes a display 200 and a main body 300. The display 200 includes a first pivot portion 210 and a second pivot portion 220. The main body 300 includes a casing 305, a third pivot portion 310, a fourth pivot portion 320, a fastening element 340, and a keyboard 400.

The third pivot portion 310, the fourth pivot portion 320, the fastening element 340, and the keyboard 400 are disposed at the casing 305. The keyboard 400 has a plurality of keys 410. At least one of the keys 410 is made of a first light-transmitting material such as an acrylic material. In the embodiment, each of the keys 410 on the keyboard 400 is made of the first light-transmitting material. In the other embodiments, parts of the keys 410 of the keyboard 400 are made of the first light-transmitting material, and the other parts of the keys 410 are made of an opaque material.

Figure 2:
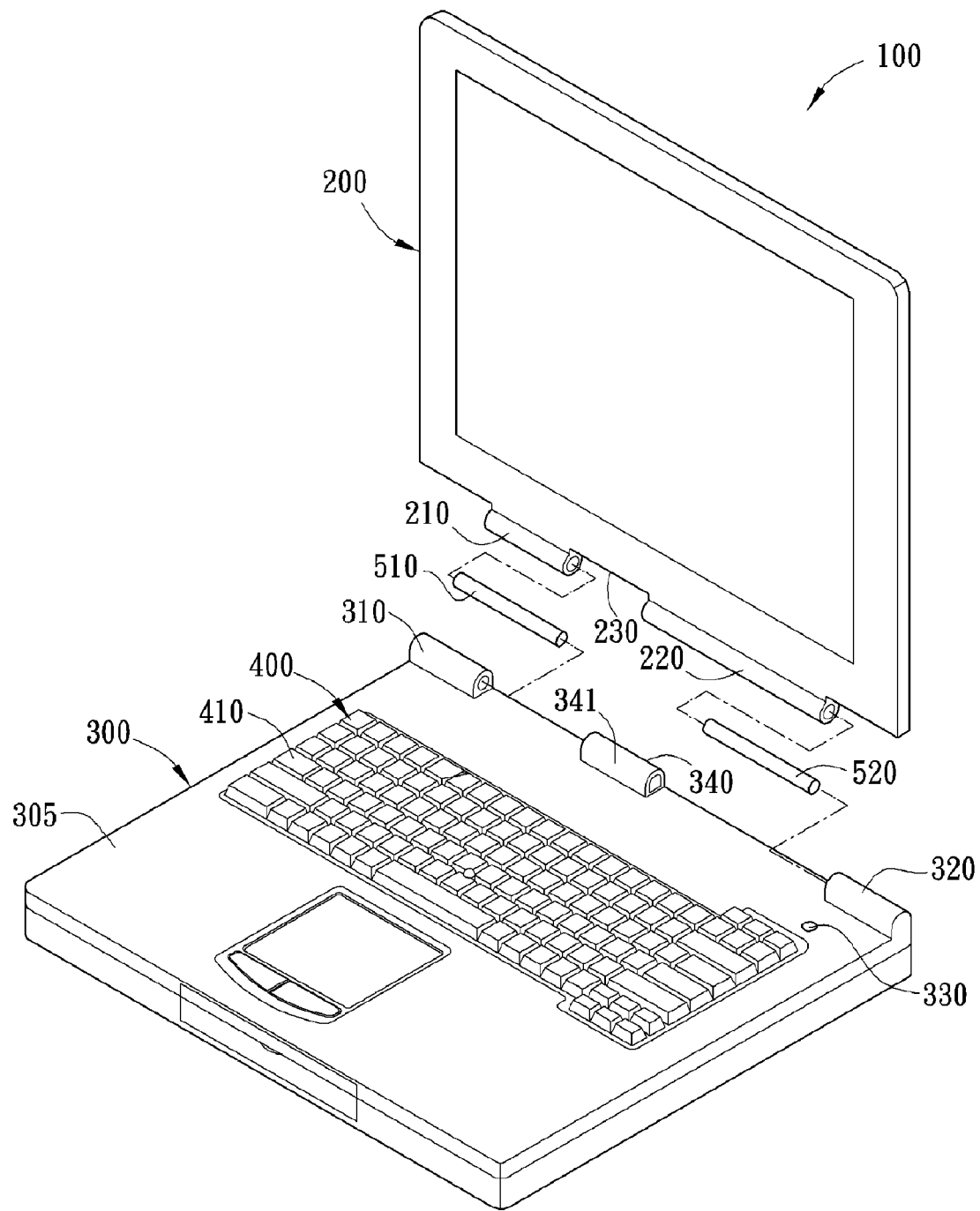
FIG. 2 is an exploded diagram of a portable electronic device according to a preferred embodiment of the invention.

FIG. 2 is an exploded diagram of the portable electronic device according to a preferred embodiment of the invention. In FIG. 2, the portable electronic device 100 further has a first hinge 510 and a second hinge 520. The first hinge 510 is pivotally connected with the first pivot portion 210 and the third pivot portion 3 10. The second hinge 520 is pivotally connected with the second pivot portion 220 and the fourth pivot portion 320 to make the display 200 and the main body 300 pivotally connected with each other.

In the embodiment, two hinges are used. In the other embodiments, a plurality of hinges may be used. For example, three hinges are used to pivotally connect the first pivot portion 210 and the third pivot portion 310, the second pivot portion 220 and the fourth pivot portion 320, and the fastening element 340, the first pivot portion 210, and the second pivot portion 220, respectively. The invention is not limited thereto.

In the embodiment, in FIG. 1 and FIG. 2, the display 200 preferably further has a recessed portion 230 at the bottom. The shape of the recessed portion 230 corresponds to that of the fastening element 340. The fastening element 340 corresponds to the recessed portion 230 and is disposed at the recessed portion 230. When the display 200 rotates relative to the main body 300 to be opened to 90 degrees, the fastening element 340 is located in the recessed portion 230 all the time.

The structure can prevent the fastening element 340 from additionally occupying the space of the main body 300, and it can also prevent the fastening element 340 from increasing the whole thickness of the portable electronic device 100.

Figure 3:
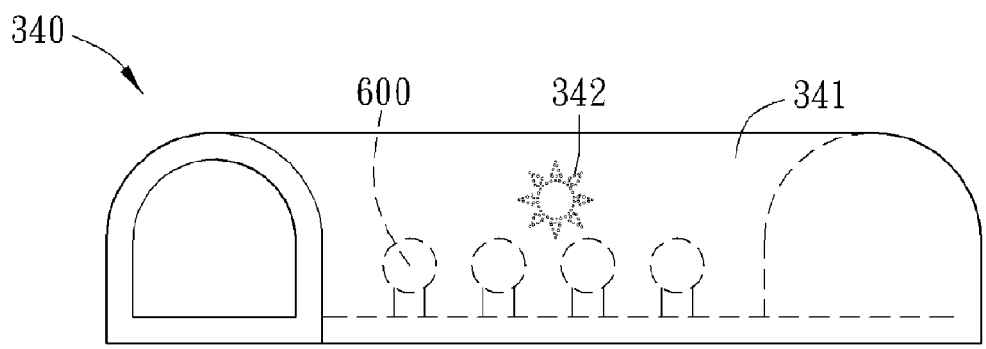
FIG. 3 is an enlarged view of a fastening element in FIG. 2.

FIG. 3 is an enlarged view of the fastening element 340 in FIG. 2. Please refer to FIG. 2 and FIG. 3. In the embodiment, a plurality of light-emitting elements 600 are disposed in the fastening element 340. The fastening element 340 has a first portion 341 and a first engraved portion 342. The first portion 341 is located between the light-emitting elements 600 and the keys 410. The first engraved portion 342 is located at the first portion 341, and it is icon-shaped. The first portion 341 is made of a second light-transmitting material.

In the embodiment, the second light-transmitting material is different from the first light-transmitting material. In the other embodiments, the second light-transmitting material may also be the same as the first light-transmitting material. When the light-emitting elements 600 light, the light emitted by the light-emitting elements 600 can pass through the first portion 341 to illuminate the first engraved portion 342 and to illuminate the keys 410. Preferably, the fastening element 340 can further be coated with a layer of transparent paint to enhance the aesthetic of the portable electronic device provided by the embodiment.

Figure 4:
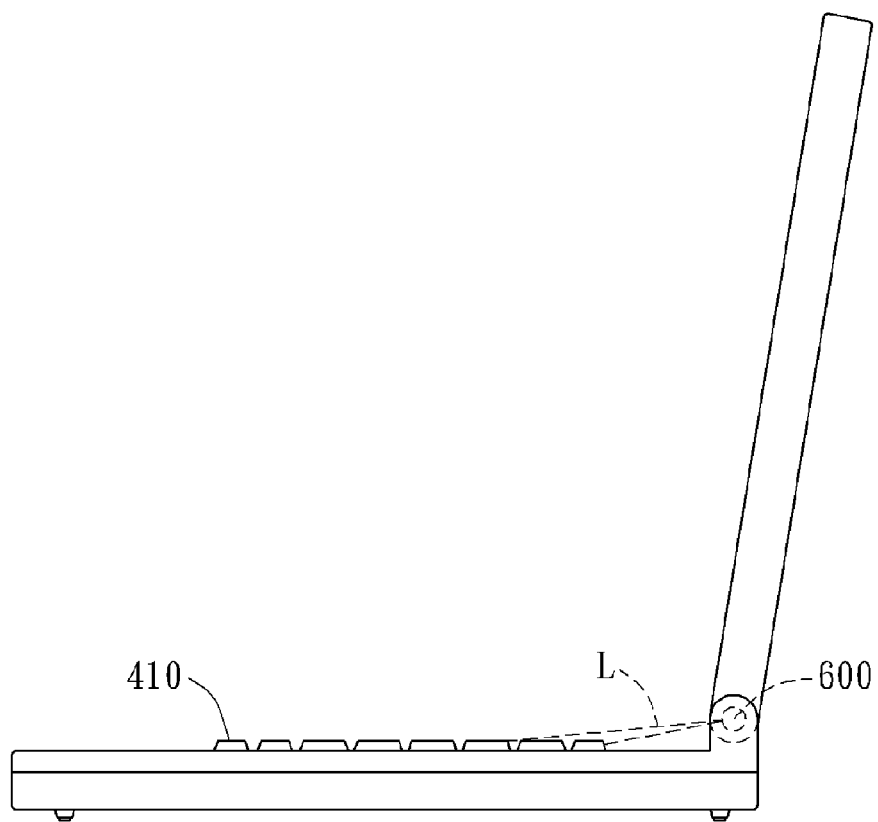
FIG. 4 is a side view of a portable electronic device according to a preferred embodiment of the invention.

FIG. 4 is a side view of a portable electronic device according to a preferred embodiment of the invention. In FIG. 4, the light-emitting elements 600 emit light L which illuminates the keys 410.

Figure 5:
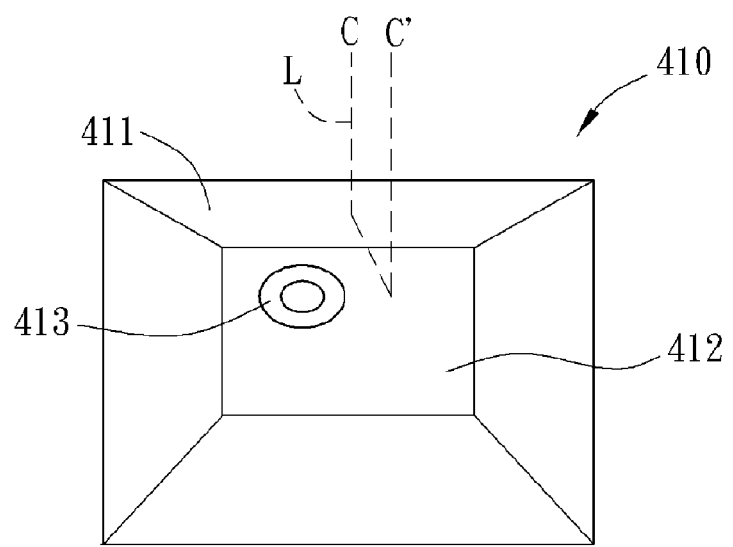
FIG. 5 is a top view showing entering of light into a key according to a preferred embodiment of the invention.
Figure 6:
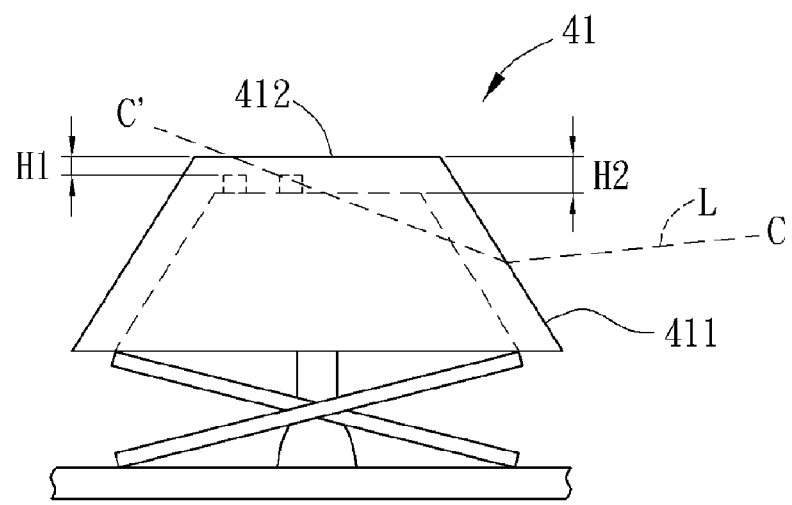
FIG. 6 is a right view showing entering of light into a key according to a preferred embodiment of the invention.

FIG. 5 is a top view showing entering of light into a key according to a preferred embodiment of the invention. FIG. 6 is a right view showing entering of light into a key according to a preferred embodiment of the invention. In FIG. 5 and FIG. 6, at least parts of the keys 410 of the keyboard have a light incident surface 411 and a light output surface 412, respectively. When the light L reaches the light incident surface 411 of the key 410 via the air, the key in the embodiment has a refraction effect. For example, the light L enters into the key 410 through the light incident surface 411 along a route C-C', and it is outputted from the key 410 through the light output surface 412. Thereby, the key 410 appears in an illuminated state.

In the embodiment, the angle between the light output surface 412 and the light incident surface 411 of the key 410 is greater than 90 degrees. The key 410 can further have other light incident surfaces and light output surfaces. In the process of light transmission, the light can enter into or be outputted from the key 410 through other surfaces.

In the embodiment, the key 410 further has a second engraved portion 413 at the top, and the shape of the second engraved portion 413 is the same as that of an input character. In FIG. 5, the second engraved portion 413 may be shaped like a letter "O", and the thickness of the second engraved portion 413 is less than that of any other parts of the key 410. In detail, in FIG. 6, the second engraved portion 413 has a first wall thickness H1, and the key 410 has a second wall thickness H2. The second wall thickness H2 is greater than the first wall thickness H1. Thus when the light is outputted from the key 410, the second engraved portion 413 is brighter than the other parts of the key 410.

In the embodiment, the letter "O" is engraved by radium. Preferably, the second engraved portion 413 is engraved in the interior of the key by radium. Thus, the surface of the key is flat, and the key has better tactility. In the other embodiments, the second engraved portion 413 can be made in other modes. When the light is outputted from the top of the second engraved portion 413, the letter "O" appears at the top. Thus, a user can clearly recognize the symbol on each key 410 to operate the corresponding key 410.

Preferably, the internal surface of the key 410 where the letter "O" is located can further be coated with a fluorescent material to enhance the aesthetic of the keyboard when the keyboard is illuminated. Furthermore, the user can easily recognize the symbols on the keyboard when the keys 410 are illuminated.

The key 410 can further be coated with a layer of transparent paint to enhance the aesthetic of the portable electronic device. In the embodiment, the surfaces other than the light incident surface 411 of the key 410 are coated with the transparent paint. Thus, the light can more easily enter into the key 410. In the other embodiments, each surface of the key can be coated with the transparent paint.

Figure 7:
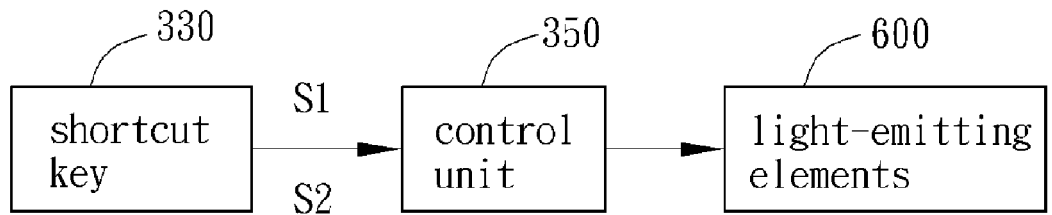
FIG. 7 is a functional diagram of a main body in FIG. 1.

FIG. 7 is a functional diagram of the main body in FIG. 1. In the embodiment, the main body 300 further includes a control unit 350 and an instant key 330. The control unit 350 is coupled to the instant key 330 and the light-emitting elements 600, respectively. In the embodiment, the instant key 330 is disposed at an upper surface of the main body 300 (as shown in FIG. 2). In the other embodiments, the instant key 330 may also be disposed at the display 200. The control unit 350 is disposed in the main body 300. Preferably, the control unit 350 can be an embedded controller.

When the user presses the instant key 330, the instant key 330 provides a first control signal S1 to the control unit 350, so that the control unit 350 can control the light-emitting elements 600 to light according to the first control signal S1. When the user presses the instant key 330 again, the instant key 330 can provide a second control signal S2 to the control unit 350, so that the control unit 350 can control the light-emitting element 600 to stop lighting according to the second control signal S2.

Thus, when the ambient environment is dark, the user can press the instant key 330 to control the keyboard 400 to be illuminated as needed. When the ambient environment is bright, the user does not need to press the instant key 330 thus to save power.

Figure 8:
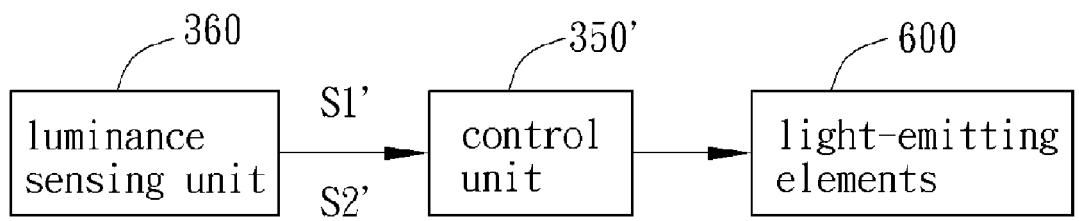
FIG. 8 is a functional diagram showing another structure of the main body in FIG. 1.

FIG. 8 is a functional diagram showing another structure of the main body in FIG. 1. In this embodiment, the main body 300 can further include a luminance sensing unit 360 and a control unit 350'. The control unit 350' is coupled to the luminance sensing unit 360 and the light-emitting elements 600, respectively. The luminance sensing unit 360 is used to sense ambient light in the vicinity of the portable electronic device 100.

In the embodiment, the luminance sensing unit 360 is disposed in the fastening element 340 to sense the ambient light, and the control unit 350' is disposed in the main body 300. In the other embodiments, the luminance sensing unit 360 may also be disposed at any other places of the portable electronic device 100, as long as it can sense the ambient light.

In the other embodiments, the luminance sensing unit 360 may be an ambient light sensor. The luminance sensing unit 360 can sense the ambient light and generate a sensed value.

When the sensed value is less than a first predetermined value such as 40 lux, the luminance sensing unit 360 provides a first control signal S1' to the control unit 350', so that the control unit 350' controls the light-emitting elements 600 to light according to the first control signal S1'. When the sensed value is greater than a second predetermined value such as 3900 lux, the luminance sensing unit 360 provides a second control signal S2' to the control unit 350', so that the control unit 350' controls the light-emitting elements 600 to stop lighting according to the second control signal S2'.

Preferably, the luminance sensing unit 360 can provides different control signals to allow the control unit 350' to control luminance of the light-emitting elements 600.

In the other embodiments, the luminance sensing unit may also be a light sensing circuit with a light sensing element. The light sensing element may be a photosensitive resistance, a photo-diode, or a photo-transistor.

Figure 9:
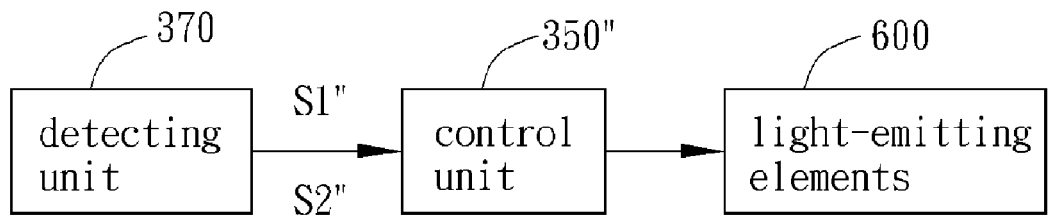
FIG. 9 is a functional diagram showing a third structure of the main body in FIG. 1.

FIG. 9 is a functional diagram showing a third structure of the main body in FIG. 1. The main body 300 can also include a detecting unit 370 coupled to a control unit 350" for detecting whether an operation function of the portable electronic device 100 is performed. For example, the detecting unit 370 may be used to detect whether the letter capitalizing function of the portable electronic device 100 is performed.

When the detecting unit 370 detects that the letter capitalizing function is performed, the detecting unit 370 provides a first control signal S1" to the control unit 350", so that the control unit 350" controls the light-emitting elements 600 to light according to the first control signal S1". When the detecting unit 370 detects that the letter capitalizing function stops being performed, the detecting unit 370 transmits a second control signal S2" to the control unit 350", so that the control unit 350" controls the light-emitting elements 600 to stop lighting according to the second control signal S2".

Thus, when the keyboard 400 is illuminated, the first engraved portion 342 is also illuminated to indicate that a certain operation function of the portable electronic device 100 is being performed. For example, the letter capitalizing function of the keyboard 400 is being performed.

The structure of controlling the light-emitting elements 600 to light can have a plurality of types, and it can be designed as needed. The invention is not limited thereto.

According to one embodiment of the invention, the user can determine whether to turn on the light-emitting elements to illuminate the keyboard according to the ambient light in the vicinity of the user. According to another embodiment of the invention, when the ambient light in the vicinity of the portable electronic device is poor, the portable electronic device can light the light-emitting elements by itself. According to a third embodiment of the invention, when one operation function of the portable electronic device is performed, the light-emitting elements illuminate the first engraved portion as well as the keyboard to indicate that the operation function is being performed.

According to the invention, even though the user is in the environment without sufficient light, the user can recognize the positions of the keys via the illuminated keyboard provided by the invention to improve the working efficiency of the user. Furthermore, the illuminated keyboard provided by the invention has a simple structure, and cost is low. When the light-emitting elements illuminate the keyboard, it also illuminates the engraved portion of the fastening element to make the engraved portion achieve an indicating function.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A portable electronic device having an illuminated keyboard, comprising:
    a display having a recessed portion; and
    a main body pivotally connected with the display, the main body including:
    a casing;
    a keyboard disposed at the casing and including a plurality of keys, wherein at least one of the keys is made of a first light-transmitting material, the key has a light incident surface and a light output surface, and an angle between the light output surface and the light incident surface of the key is greater than 90 degrees;
    a fastening element fastened to the casing, the fastening element having a first portion made of a second light-transmitting material and corresponding to the recessed portion; and
    a plurality of light-emitting elements disposed in the fastening element, wherein the light emitted by the light-emitting elements passes through the first portion of the fastening element to directly enter into the key through the light incident surface and to be outputted from the key through the light output surface.

2. The portable electronic device according to claim 1, wherein the first portion has a first engraved portion.

3. The portable electronic device according to claim 2, wherein the first engraved portion is icon-shaped.

4. The portable electronic device according to claim 2, wherein the light emitted by the light-emitting elements illuminates the first engraved portion and at least one key.

5. The portable electronic device according to claim 2, wherein illumination of the first engraved portion by the light-emitting elements indicates that an operation function of the portable electronic device is being performed.

6. The portable electronic device according to claim 1, wherein the main body further includes a control unit coupled to the light-emitting elements, the control unit receives a control signal and controls operation of the light-emitting elements according to the control signal.

7. The portable electronic device according to claim 6, wherein the main body further includes an instant key coupled to the control unit, and when the instant key is pressed, the instant key generates the control signal.

8. The portable electronic device according to claim 6, wherein the main body further includes a luminance sensing unit coupled to the control unit for sensing ambient light to generate a sensed value, and when the sensed value is less than a predetermined value, the luminance sensing unit provides the control signal to the control unit.

9. The portable electronic device according to claim 1, wherein the shape of the recessed portion corresponds to that of the fastening element.

10. The portable electronic device according to claim 1, wherein the portable electronic device further comprises a hinge pivotally connected with the display and the main body, respectively.

11. The portable electronic device according to claim 1, wherein the display further has a first pivot portion and a second pivot portion, the main body further has a third pivot portion and a fourth pivot portion, the first pivot portion is pivotally connected with the third pivot portion, and the second pivot portion is pivotally connected with the fourth pivot portion.

12. The portable electronic device according to claim 1, wherein the light output surface of the key has a second engraved portion, and the shape of the second engraved portion is the same as that of an input character.

13. The portable electronic device according to claim 12, wherein the second engraved portion has a first wall thickness, and the key has a second wall thickness greater than the first wall thickness.

* * * * *